(12) United States Patent
Verhoorn, III et al.

(10) Patent No.: US 6,725,371 B1
(45) Date of Patent: Apr. 20, 2004

(54) SECURE PACKET PROCESSOR

(75) Inventors: Frank C. Verhoorn, III, Beaverton, OR (US); Jonathan Lo, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/345,683

(22) Filed: Jun. 30, 1999

(51) Int. Cl.$^7$ .................................................. H04J 9/32
(52) U.S. Cl. ...................... 713/161; 713/176; 713/179
(58) Field of Search ................................ 713/153, 161, 713/176, 178; 380/30

(56) References Cited

U.S. PATENT DOCUMENTS 6,092,191 A * 7/2000 Shimbo et al. ............. 713/153
6,389,532 B1 * 5/2002 Gupta et al. ................ 713/163

FOREIGN PATENT DOCUMENTS

EP    0 689 316 A2 * 12/1995 ............. H04L/9/32
EP    0 898 216 A2    2/1999 ............. G06F/1/00

* cited by examiner

Primary Examiner—Justin T. Darrow
(74) Attorney, Agent, or Firm—Trop, Pruner & Hu, P.C.

(57) ABSTRACT

A secure packet processor includes a buffer, a cryptographic engine and an authentication engine. The buffer is adapted to receive a secure packet that includes encrypted data and indicates an authentication signature. The cryptographic engine is adapted to decrypt the encrypted data to produce an indication of second data. The authentication engine is adapted to use the encrypted data to validate the signature concurrently with the decryption of at least a portion of the decrypted data. The authentication engine and the cryptographic engines may also be adapted to concurrently validate and encrypt data of an unsecure packet.

27 Claims, 5 Drawing Sheets

SECURE PACKET PROCESSOR

BACKGROUND

The invention relates to a secure packet processor.

Referring to FIG. 1, a server 12 may communicate with a client 10 by transmitting frames, or packets 8, of information over a network 18 pursuant to a network protocol. As an example, the network protocol may be a Transmission Control Protocol/Internet Protocol (TCP/IP), and as a result, the client 10 and server 12 may implement protocol stacks, such as TCP/IP stacks 17 and 19, respectively. For the client 10 (as an example), the TCP/IP stack 17 conceptually divides the client's software and hardware protocol functions into five hierarchical layers 16 (listed in hierarchical order): an application layer 16a (the highest layer), a transport layer 16b, a network layer 16c, a data link layer 16d and a physical layer 16e (the lowest layer).

More particularly, the physical layer 16e typically includes hardware (a network controller, for example) that establishes physical communication with the network 18 by generating and receiving signals (on a network wire 9) that indicate the bits that make up the packets 8. The physical layer 16e recognizes bits and does not recognize packets, as the data link layer 16d performs this function. In this manner, the data link layer 16d typically is both a software and hardware layer that may, for transmission purposes, cause the client 10 to package the data to be transmitted into the packets 8. For purposes of receiving packets 8, the data link layer 16d may, as another example, cause the client 10 to determine the integrity of the incoming packets 8 by determining if the incoming packets 8 generally conform to predefined formats and if the data of the packets comply with cyclic redundancy check (CRC) codes or other error correction codes of the packets. The data link layer 16d may also perform address filtering.

The network layer 16c typically is a software layer that is responsible for routing the packets 8 over the network 18. In this manner, the network layer 16c typically causes the client 10 to assign and decode Internet Protocol (IP) addresses that identify entities that are coupled to the network 18, such as the client 10 and the server 12. The transport layer 16b typically is a software layer that is responsible for such things as reliable data transfer between two endpoints and may use sequencing, error control and general flow control of the packets 8 to achieve it. The transport layer 16b may cause the client 10 to implement a specific protocol, such as the TCP protocol or a User Datagram Protocol (UDP), as examples. The application layer 16a typically includes network applications that, upon execution, cause the client 10 to generate and receive the data of the packets 8. Quite often, the packets may be secure packets (Internet Protocol Security (IPSec) packets, as examples) that have security features that may delay processing of the packets by network devices, such as the client 10 and the server 12. The IPSec standard is discussed in Request for Comment (RFC) 2401, entitled "Security Architecture for the Internet Protocol," dated November 1998. Requests for comments (RFCs) are available at several sites on the Internet.

As an example of the processing that is associated with secure packets, FIG. 2 depicts the conversion of an unsecure packet 30 into a secure packet 37. In particular, the client 10, for example, may use a two stage process to add security features to the packet 30. In this manner, the client 10 may first encrypt an unencrypted portion (called plaintext 32) of the packet 30 to produce an intermediate packet 36 that includes ciphertext 34, the encrypted version of the plaintext 32. Next, the client 10 may process the intermediate packet 36 to produce the secure packet 37 that includes an authentication signature 39 and the ciphertext 34. Secure packets that the client 10 receives from the network 18 may also be processed in a similar manner that first includes authenticating the received packet and then decrypting the ciphertext of the received packet. Unfortunately, the above-described processing contributes to the latency times that are introduced by converting between secure and unsecure packets.

Thus, there is a continuing need to address one or more of the problems stated above.

SUMMARY

In one embodiment of the invention, a method usable with a computer system includes receiving a packet that includes encrypted data and indicates an authentication signature. The encrypted data is decrypted to produce second data, and the encrypted data is used to validate the signature concurrently with the decryption of at least a portion of the encrypted data.

In another embodiment, a method usable with a computer system includes receiving a packet that includes first data. The first data is encrypted to produce encrypted data. The encrypted data is used to form an authentication signature concurrently with the encryption of at least a portion of the first data.

DETAILED DESCRIPTION

Figure 1:
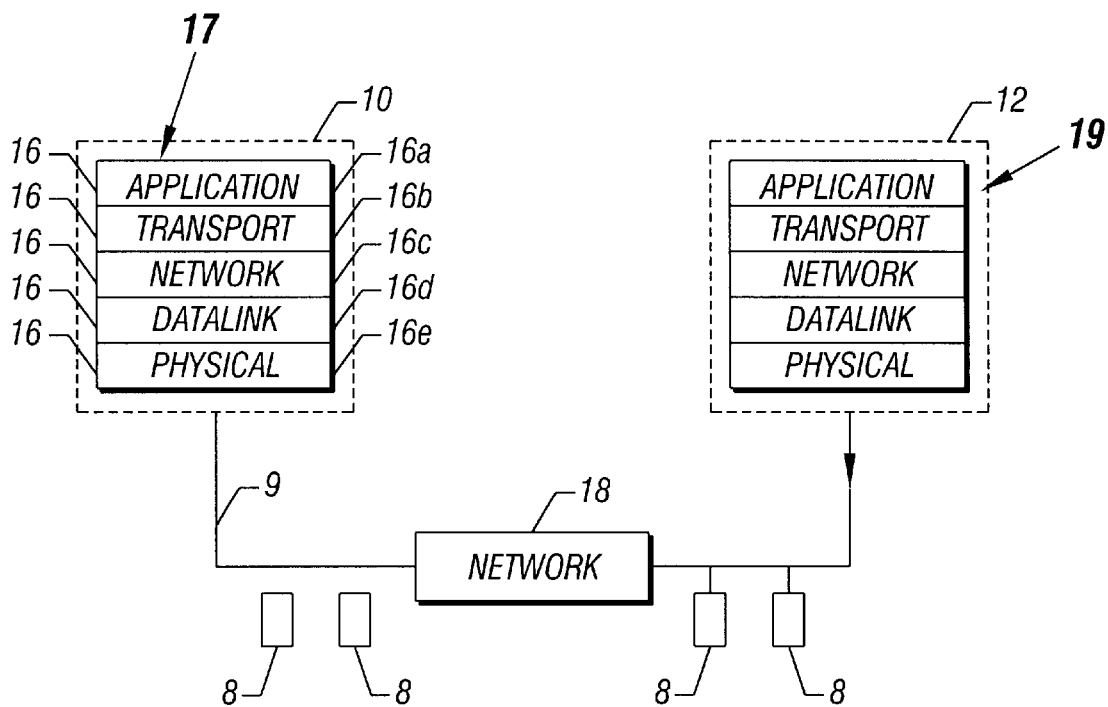
FIG. 1 is a schematic diagram of a system of networked computers of the prior art.
Figure 2:
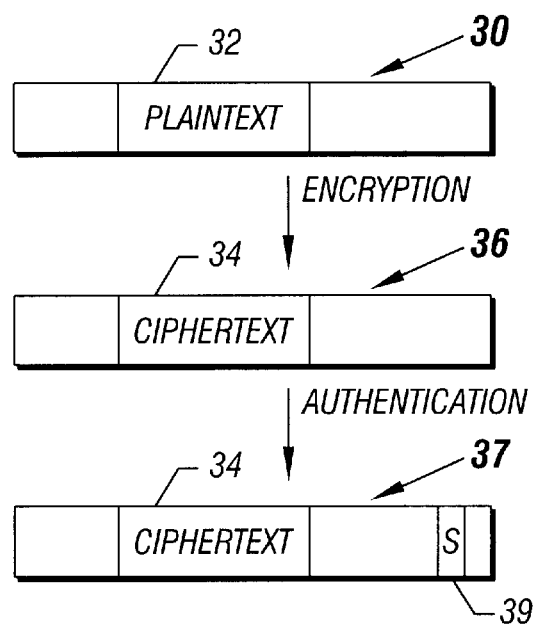
FIG. 2 is a diagram illustrating the conversion of an unsecure packet into a secure packet according to the prior art.
Figure 3:
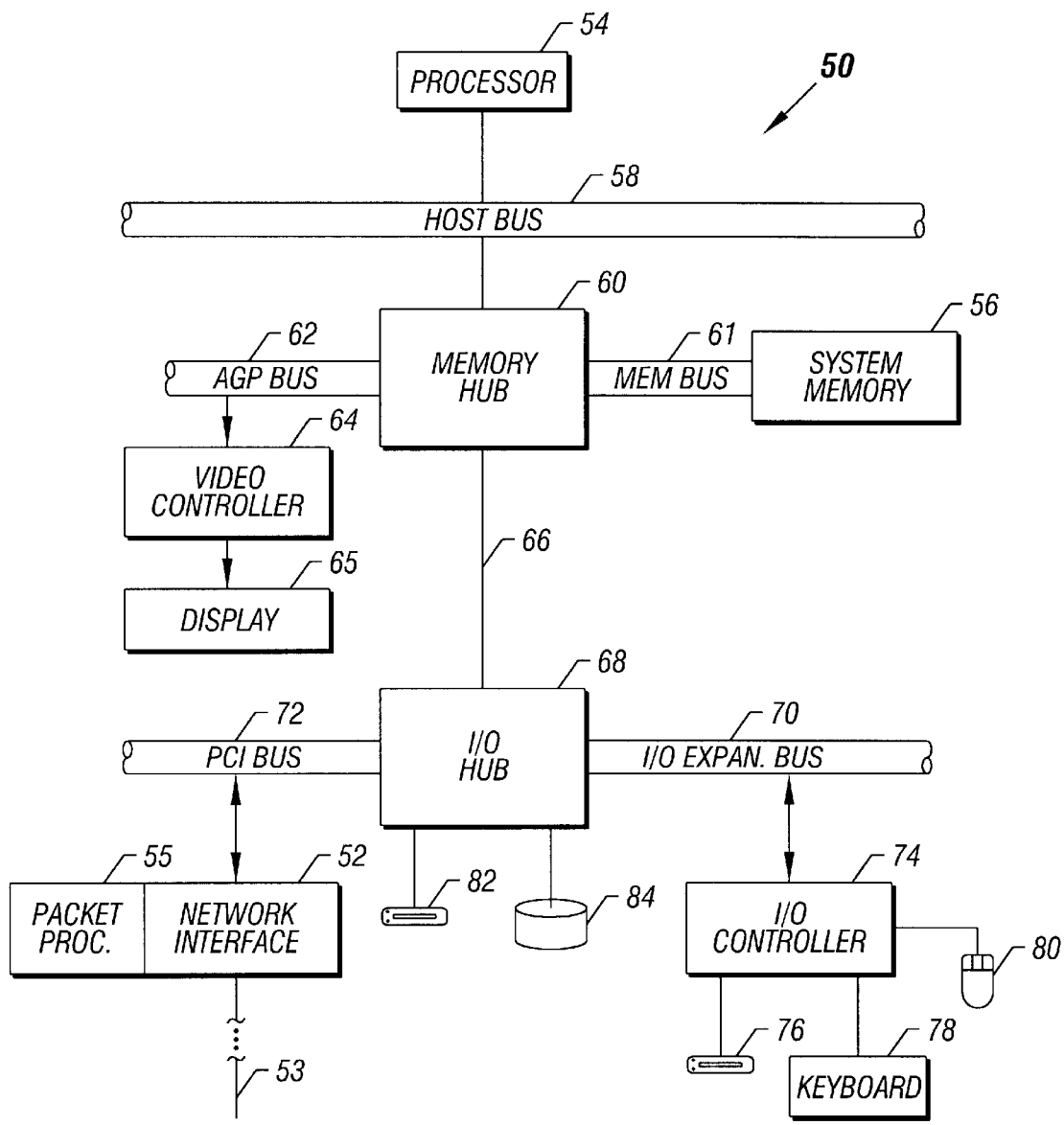
FIG. 3 is a schematic diagram of a computer system according to an embodiment of the invention.

Referring to FIG. 3, an embodiment 50 of a computer system in accordance with the invention includes a network interface 52 (a local area network (LAN) controller, for example) that communicates secure packets of information with other networked computer systems via a network wire 53 and communicates unsecure packets with devices of the computer system 50 via a bus 72. The computer system 50 may also include a secure packet processor 55 that, unlike conventional circuitry, is adapted to concurrently perform authentication and decryption functions to convert an incoming secure packet into an unsecure packet. More particularly, the packet processor 55 is adapted to generate a signature for an incoming secure packet (that is received from the network wire 53) while the packet processor 55 decrypts ciphertext (i.e., encrypted data) of the incoming secure packet to create part of the unsecure packet. In some embodiments, a microprocessor 54 (a central processing unit (CPU), for example) may execute software of a network stack to use the generated signature to authenticate the incoming packet.

In some embodiments, the packet processor 55 is adapted to concurrently use authentication and encryption functions to convert outgoing unsecure packets into secure packets. In this manner, in some embodiments, the packet processor 55 is adapted to add security features to an outgoing unsecure packet to form an outgoing secure packet. For example, the packet processor 55 forms an authentication signature for an outgoing secure packet (that is to be furnished to the network wire 53) while the packet processor 55 encrypts data for the outgoing secure packet. Thus, for a particular packet, the packet processor 55 is adapted to perform at least a portion of its cryptographic and authentication functions in parallel, as further described below.

In the context of this application, the term "secure" generally refers to a type of packet that has security features, such as an authentication signature and encrypted data (i.e., ciphertext), as examples. In general, the secure packets are communicated over a network via the network wire 53. Thus, the network interface 52 receives a signal from the network wire 53 that indicates incoming secure packets from the network and conversely furnishes a signal to the network wire 53 that indicates outgoing secure packets to the network. As an example, one type of secure packet is an IPSec (Internet Protocol Security) packet. The term "unsecure" generally refers to a type of packet that does not have one or more security features of the secure packet. For example, an unsecure packet may include unencrypted data (i.e., plaintext) instead of encrypted data (i.e., ciphertext).

In general, the network interface 52 communicates secure packets with the network, stores incoming secure packets (received from the network) in a system memory 56 (of the computer system 50) and retrieves outgoing secure packets (to be transmitted to the network) from the system memory 56. The packet processor 55, in turn, converts outgoing unsecure packets into outgoing secure packets that are communicated to the network via the network interface 52 and converts incoming secure packets into incoming unsecure packets that may be processed by other devices of the computer system 50.

For example, the packet processor 55 may receive an outgoing unsecure packet that was built and temporarily stored in the system memory 56 of the computer system 50 by the microprocessor 54, for example. Upon receipt of the outgoing unsecure packet, the packet processor 55 begins transferring the packet into a secure packet suitable for transmission over the network. In this manner, the packet processor 55 may form an authentication signature for the packet and encrypt data of the packet to form an outgoing secure packet.

Similarly, the network interface 52 may receive and store an incoming secure packet in the system memory 56. In this manner, the packet processor 55 may retrieve the incoming packet from the system memory 56 and begin transforming the packet into an unsecure packet for use with devices of the computer system 50. In this manner, the packet processor 55 may decrypt encrypted data from the secure incoming packet to form an unsecure incoming packet that is ultimately stored in the system memory 56. The packet processor 55 may also generate a signature for the incoming secure packet, and the microprocessor 54 (through execution of stack software) may then authenticate the signature.

Figure 4:
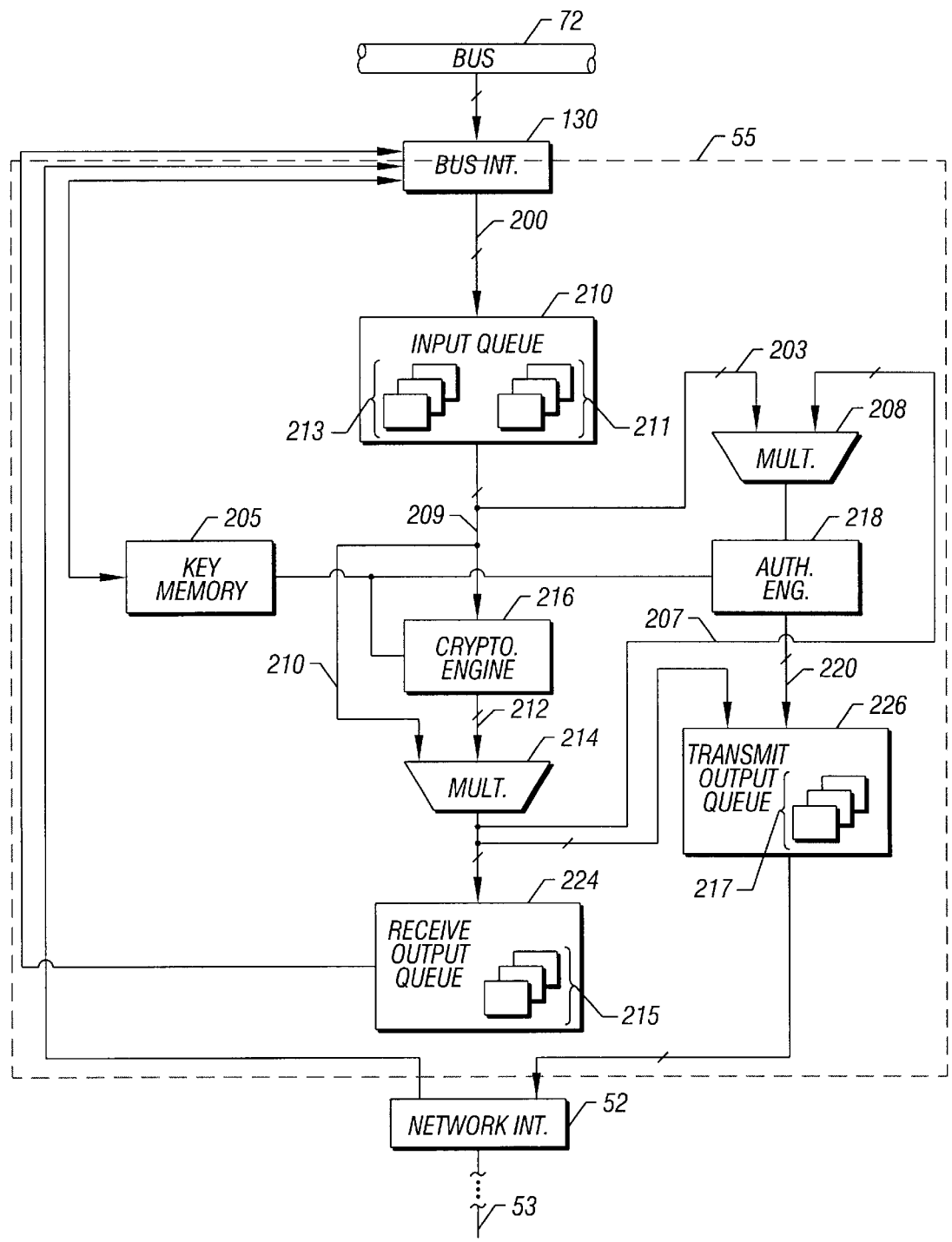
FIG. 4 is a more detailed schematic diagram of a packet processor of FIG. 3 according to an embodiment of the invention.

FIG. 4 depicts a more detailed schematic diagram of the packet processor 55. As shown, in some embodiments, the packet processor 55 includes an input queue 210 that may store one or more incoming secure packets 211 (from the network) that are initially transferred from the network interface 53 (via a bus interface 130) to the system memory 56 and then communicated from the system memory 56 into the queue 210. While in the system memory 56, the microprocessor 54 may execute software that is associated with a network stack to identify a flow context of the packet and thus, identify the key(s) to be used for purposes of decryption and generation of the signature. The input queue 210 may also store one or more outgoing unsecure packets 213 (to be furnished to the network after being converted into secure packets). The packet processor 55 routes each incoming secure packet 211 through circuitry to decrypt data (via a cryptographic engine 216) of the packet 211 and generate (via an authentication engine 218) a signature for the packet 211 to form a corresponding incoming unsecure packet 215 that is stored in a receive output queue 224. The microprocessor 54, when executing the stack, may determine whether the signature is valid, and thereby authenticate the signature.

The packet processor 55 routes each outgoing unsecure packet 213 through circuitry to encrypt data (via the cryptographic engine 216) of the packet 213 and generate (via the authentication engine 218) a signature to form a corresponding outgoing secure packet 217 that is stored in a transmit output queue 226. The packet processor 55 routes the outgoing secure packets 217 to the network and routes the incoming unsecure packets 215 to the system memory 56 for access by the microprocessor 54 (when executing software that is associated with the a network stack, for example).

More particularly, a particular incoming secure packet 211 flows through the packet processor 55 in a data stream that traverses the following path. Indications of the data stream are routed in parallel to the cryptographic engine 216 (via data lines 209) and to the authentication engine 218 (via data lines 203) that route indications of the data stream through a multiplexer 208 and to the authentication engine 218. The data stream includes encrypted data that is modified by the cryptographic engine 216 (to produce plaintext data) and data that is not modified by the cryptographic engine 216. To accomplish this, the cryptographic engine 216 uses a key that is stored in a key memory 205, as further described below. Indications of the unmodified data bypasses the cryptography engine 216 via data lines 210, and the cryptographic engine 216 furnishes indications of the decrypted data to data lines 212. In this manner, when the data outside of the encrypted portion of the packet appears in the data stream, a multiplexer 214 couples the data lines 210 to the receive output queue 224. Otherwise, the multiplexer 214 couples the data lines 212 to the receive output queue 224. Therefore, the decrypted data and the data that bypasses the cryptography engine 216 are merged together in the receive output queue 224 to form the corresponding incoming unsecure packet 215.

The authentication engine 218 receives the indications of the data stream (via the data lines 203) in parallel with the cryptographic engine 216 and uses these indications to form an authentication signature of the incoming packet. In this manner, the authentication engine 218 uses a key (from the key memory 205) and at least a portion of the ciphertext from the received packet to generate a signature that may be later verified by the execution of stack software. The signature, the decrypted data and the remaining data are stored in the receive output queue 224.

For an outgoing unsecure packet 213, the cryptographic engine 216 receives plaintext data from a data stream that flows from the packet 213. In this manner, the cryptographic engine 216 encrypts (using a key that is stored in the key memory 205) the portion of the data stream that corresponds to the plaintext data. The authentication engine 218 uses the encrypted data that is produced by the cryptographic engine 216 and a key from the key memory 205 to form an indication of an authentication signature and store the indication in the corresponding outgoing secure packet 217. However, unlike conventional arrangements, the cryptographic engine 216 does not encrypt all of the plaintext data of the packet 213 portion before the authentication engine 218 begins forming the signature. Instead, the authentication engine 218 receives the encrypted data, as furnished, from the cryptographic engine 216 and begins forming the signature before the cryptographic engine 216 has completed forming the unencrypted data (i.e., the plaintext) for the outgoing secure packet 217.

To accomplish this, data lines 207 couple the output terminals of the cryptographic engine 216 to the input terminals of the multiplexer 208. In this manner, for an outgoing packet, the multiplexer 208 couples the data lines 207 to the authentication engine 218 so that the authentication engine 218 receives the indications of the encrypted data that is provided by the authentication engine 218. When the authentication engine 218 forms the indication of the authentication signature, the authentication engine 218 stores the indication in the outgoing secure packet 217 in the transmit output queue 226.

The particular key that is used by the authentication engine 218 and/or the cryptographic engine 216 is associated with a particular flow context that may be identified by execution of stack software by the microprocessor 54 when the packet is stored in the system memory 56. In this manner, a particular packet is associated with a particular flow context that, in turn, identifies a key in the key memory 205 to be used with the packet.

Figure 5:
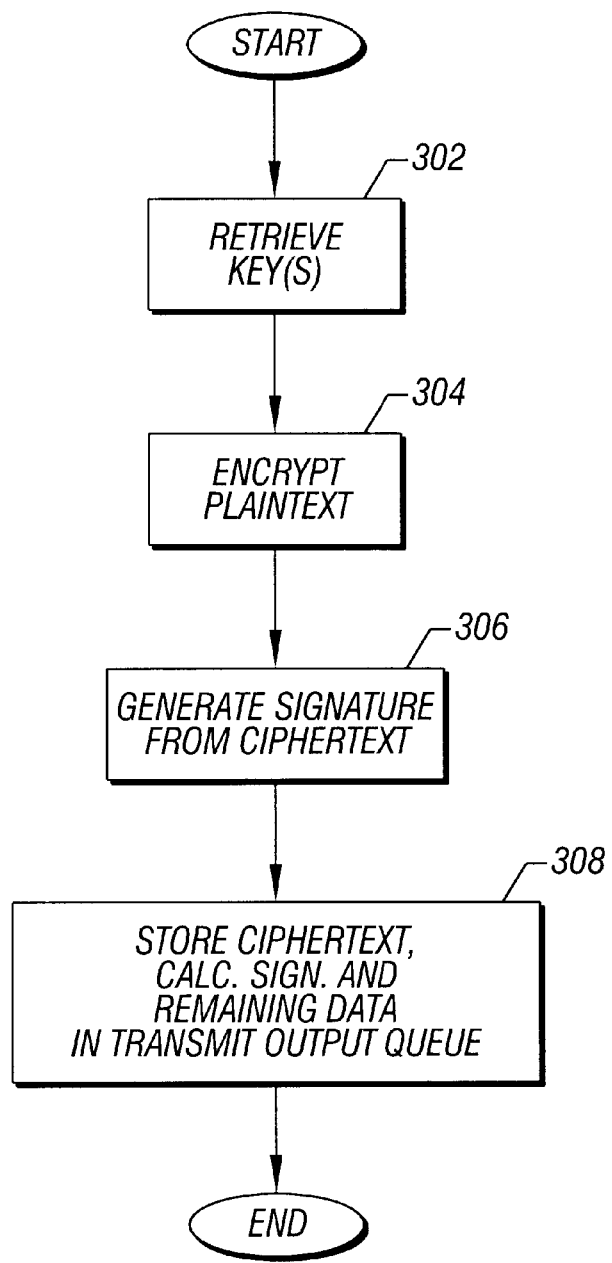
FIG. 5 is a flow diagram illustrating conversion of an unsecure packet into a secure packet according to an embodiment of the invention.

Referring to FIG. 5, to summarize, to process an outgoing unsecure packet 213 (to convert the packet into an outgoing secure packet 217), the packet processor 55 performs the following steps. First, the cryptographic engine 216 and the authentication engine 218 retrieve (block 302) the appropriate key(s) from the key memory 205. The cryptographic engine 216 begins encrypting (block 304) the plaintext of the packet, and after the cryptographic engine 216 begins furnishing the ciphertext, the authentication engine 218 begins generating (block 306) the authentication signature from the ciphertext. The cryptographic engine 216 and the authentication engine 218 store (block 308) the ciphertext, the calculated signature and the remaining data in the transmit output queue 226 to form the outgoing secure packet 217.

Figure 6:
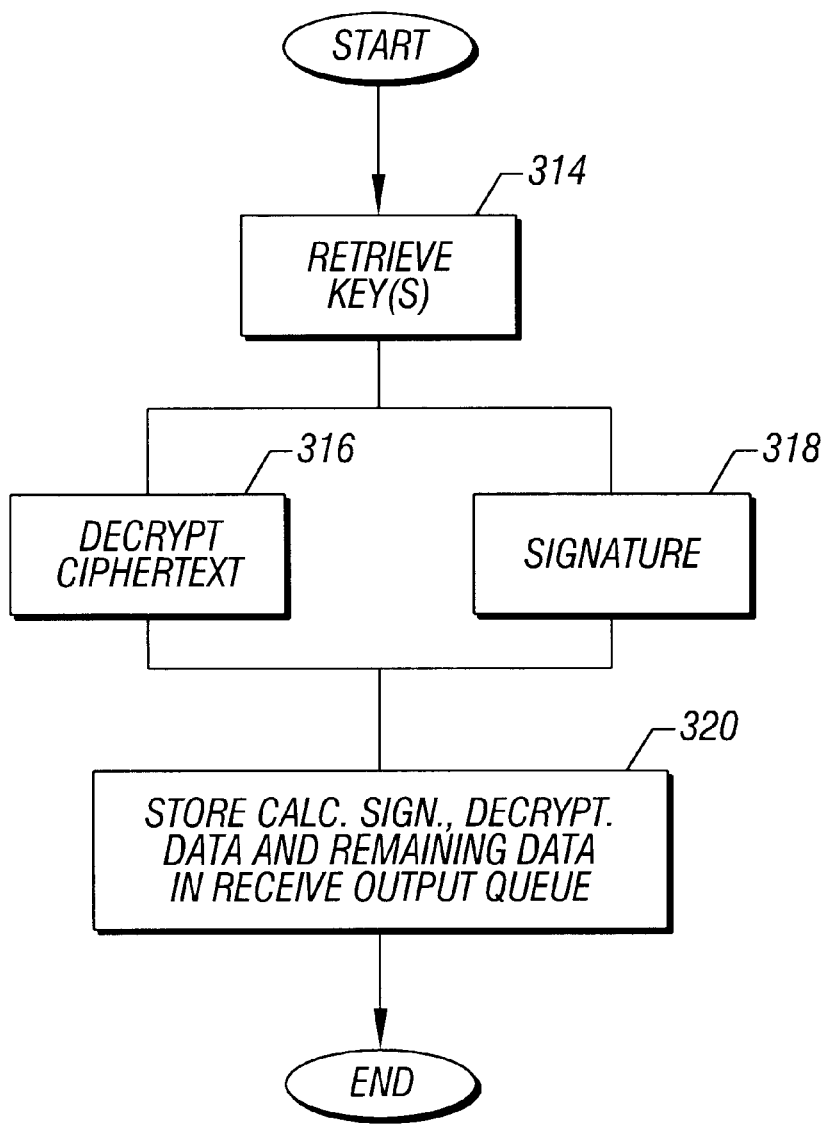
FIG. 6 is a flow diagram illustrating conversion of a secure packet into an unsecure packet according to an embodiment of the invention.

Referring to FIG. 6, for an incoming secure packet 211, the packet processor 55 performs the following steps to convert the packet into an incoming unsecure packet 215. First, the cryptographic engine 216 and the authentication engine 218 retrieve (block 314) the appropriate key(s) from the key memory 205. The cryptographic engine 216 and the authentication engine 218 then begin decrypting ciphertext (block 316) and validating the signature (block 318) in parallel. The cryptographic engine 216 and the authentication engine 218 then store (block 320) the decrypted data, the calculated signature and the remaining data in the receive output queue 224 to form the incoming unsecure packet 215.

The advantages of the above-described arrangement may include one or more of the following: processing latency may be reduced; the transmit and receive output queues may prevent a blockage in the receive or transmit paths from hindering the controller's ability to process packets in the unblocked path; and cryptographic and authentication operations may be performed at least partially in parallel.

Referring to FIG. 4, among the other features of the packet processor 55, the packet processor 55, in some embodiments, includes a bus interface 130 that establishes communication between the packet processor 55, the network interface 52 and the bus 72. In this manner, the bus interface 130 may decode operations from the bus 72 to furnish indications (via data lines 200) of bytes of packets to be stored in the input queue 210. The receive output queue 224 may be coupled to the bus interface 130, and the transmit output queue 226 may be coupled to the network interface 52. A control unit 190 may control (via control lines 191) and coordinates the above-described activities of the packet processor 55.

Referring back to FIG. 3, besides the packet processor 55 and the network interface 52, the computer system 50 may include the microprocessor 54 that is coupled to a host bus 58. The microprocessor 54 may generally refer to one or more central processing units (CPUs), microcontrollers or microprocessors (an X86 microprocessor, a Pentium® microprocessor or an Advanced RISC Machine (ARM) microprocessor, as examples), as just a few examples. Furthermore, the phrase "computer system" may refer to any type of processor-based system that may include a desktop computer, a laptop computer, an appliance or a set-top box, as just a few examples. Thus, the invention is not intended to be limited to the illustrated computer system 50 but rather, the computer system 50 is an example of one of many possible embodiments of the invention.

The host bus 58 may be coupled by a bridge, or memory hub 60, to an Accelerated Graphics Port (AGP) bus 62. The AGP is described in detail in the Accelerated Graphics Port Interface Specification, Revision 1.0, published in Jul. 31, 1996, by Intel Corporation of Santa Clara, Calif. The AGP bus 62 may be coupled to, for example, a video controller 64 that controls a display 65. The memory hub 60 may also couple the AGP bus 62 and the host bus 58 to a memory bus 61. The memory bus 61, in turn, may be coupled to a system memory 56 that may, as examples, store the buffers 304 and a copy of the driver program 57.

The memory hub 60 may also be coupled (via a hub link 66) to another bridge, or input/output (I/O) hub 68, that is coupled to an I/O expansion bus 70 and the bus 72. The I/O hub 68 may also be coupled to, as examples, a CD-ROM drive 82 and a hard disk drive 84. The I/O expansion bus 70 may be coupled to an I/O controller 74 that controls operation of a floppy disk drive 76 and receives input data from a keyboard 78 and a mouse 80, as examples. As an example, the bus 72 may be a Peripheral Component Interconnect (PCI) bus. The PCI Specification is available from The PCI Special Interest Group, Portland, Oreg. 97214.

While the invention has been disclosed with respect to a limited number of embodiments, those skilled in the art, having the benefit of this disclosure, will appreciate numerous modifications and variations therefrom. It is intended that the appended claims cover all such modifications and variations as fall within the true spirit and scope of the invention.

What is claimed is:

1. A method usable with a computer system, comprising:
   receiving a packet that includes first data;
   encrypting the first data to produce encrypted data;
   using the encrypted data to form an authentication signature concurrently with the encryption of at least a portion of the first data;

merging the encrypted data with the signature to form another packet; and storing said another packet in a transmit output queue.

2. The method of claim 1, wherein said another packet comprises a secure packet.

3. The method of claim 1, further comprising:

communicating said another packet to a network.

4. The method of claim 1, wherein the packet comprises an unsecure packet.

5. A method usable with a computer system, comprising:

receiving a packet that includes encrypted data and indicates an authentication signature;

decrypting the encrypted data to produce decrypted data; and using the encrypted data to validate the signature concurrently with the decryption of at least a portion of the encrypted data.

6. The method of claim 5, further comprising:

generating another signature from the encrypted data;

merging the decrypted data with said another signature to form another packet; and storing said another packet in a receive output buffer.

7. The method of claim 6, wherein said another packet comprises an unsecure packet.

8. The method of claim 6, further comprising:

storing said another packet in a system memory of the computer system.

9. The method of claim 5, wherein the packet comprises a secure packet.

10. A packet processor comprising:

an input queue adapted to receive a packet that includes first data;

a cryptographic engine adapted to encrypt the first data to produce an indication of encrypted data;

an authentication engine adapted to use the indication of the encrypted data to form an indication of an authentication signature concurrently with the encryption of at least a portion of the first data; and a transmit output queue coupled to the cryptographic engine and the authentication engine, wherein the cryptographic engine and the authentication engine are further adapted to merge the encrypted data with the signature to form another packet in the transmit output queue.

11. The packet processor of claim 10, wherein said another packet comprises a secure packet.

12. The packet processor of claim 10, further comprising:

a network interface adapted to communicate said another packet to a network.

13. The packet processor of claim 10, wherein the packet comprises an unsecure packet.

14. A packet processor comprising:

an input queue adapted to receive a packet that includes encrypted data and indicates an authentication signature;

a cryptographic engine adapted to decrypt the encrypted data to produce an indication of decrypted data; and an authentication engine adapted to use the encrypted data to generate another signature concurrently with the decryption of at least a portion of the encrypted data.

15. The packet processor of claim 14, further comprising:

a receive output queue coupled to the cryptographic engine and the authentication engine, and wherein the cryptographic engine and the authentication engine are adapted to merge the decrypted data with said another signature to form another packet in the receive output queue.

16. The packet processor of claim 15, wherein said another packet comprises an unsecure packet.

17. The packet processor of claim 15, further comprising:

a bus interface adapted to store said another packet in a system memory of the computer system.

18. The packet processor of claim 14, wherein the packet comprises a secure packet.

19. A computer system comprising:

a system memory;

a microprocessor adapted to store a packet in the system memory, the packet including first data; and a packet processor comprising:

an input queue;

an interface adapted to retrieve the packet from the system memory and store the packet in the input queue;

a cryptographic engine adapted to encrypt the first data to produce an indication of encrypted data;

an authentication engine adapted to use the indication of the encrypted data to form an indication of an authentication signature concurrently with the encryption of at least a portion of the first data; and a transmit output queue coupled to the cryptographic engine and the authentication engine, wherein the cryptographic engine and the authentication engine are further adapted to merge the encrypted data with the signature to form another packet in the transmit output queue.

20. The computer system of claim 19, wherein said another packet comprises a secure packet.

21. The computer system of claim 19, further comprising:

a network interface adapted to communicate said another packet to a network.

22. The computer system of claim 19, wherein the packet comprises an unsecure packet.

23. A computer system comprising:

a system memory;

a microprocessor adapted to store a packet in the system memory, the packet including encrypted data and indicating an authentication signature; and a packet processor comprising:

a cryptographic engine adapted to decrypt the encrypted data to produce an indication of decrypted data; and an authentication engine adapted to use the encrypted data to generate another signature concurrently with the decryption of at least a portion of the encrypted data.

24. The computer system of claim 23, further comprising:

a receive output queue coupled to the cryptographic engine and the authentication engine, and wherein the cryptographic engine and the authentication engine are adapted to merge the decrypted data with said another signature to form another packet in the receive output queue.

25. The computer system of claim 24, wherein said another packet comprises an unsecure packet.

26. The computer system of claim 24, further comprising:

a bus interface adapted to store said another packet in a system memory of the computer system.

27. The computer system of claim 23, wherein the packet comprises a secure packet.

* * * * *